April 28, 1953   D. P. PRATT   2,636,428
CULTIVATOR ATTACHMENT FOR TRACTORS
Filed July 18, 1951
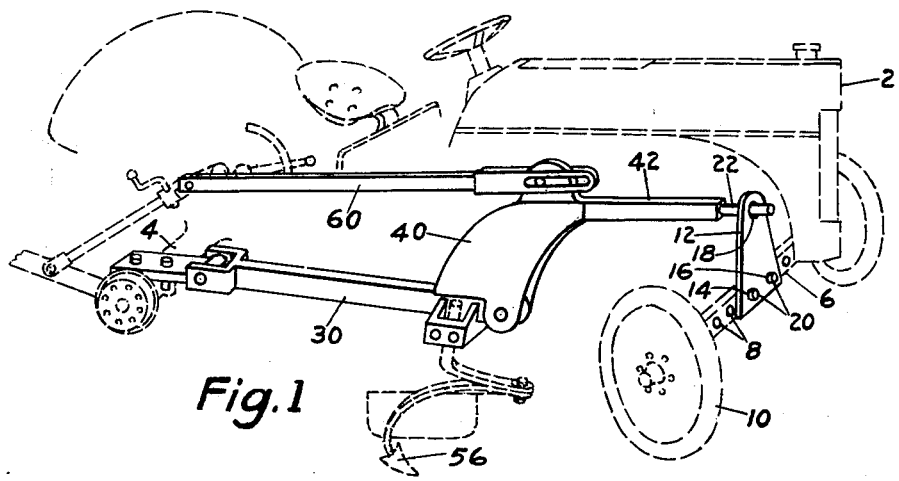
Fig.1
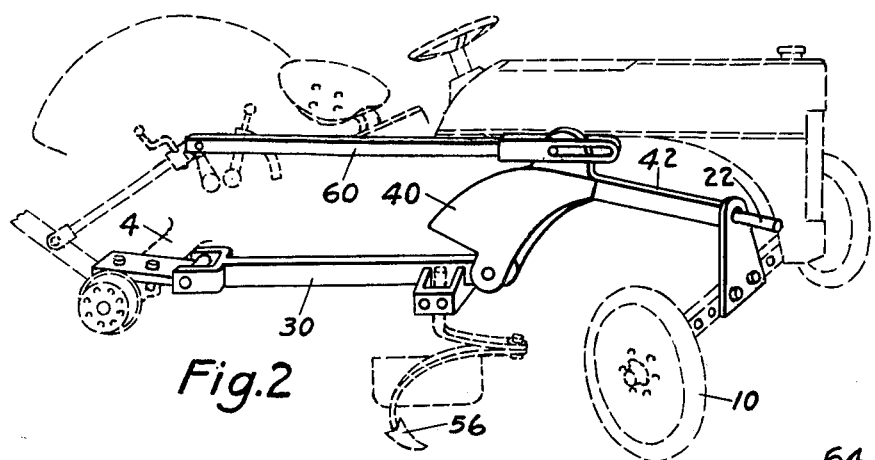
Fig.2
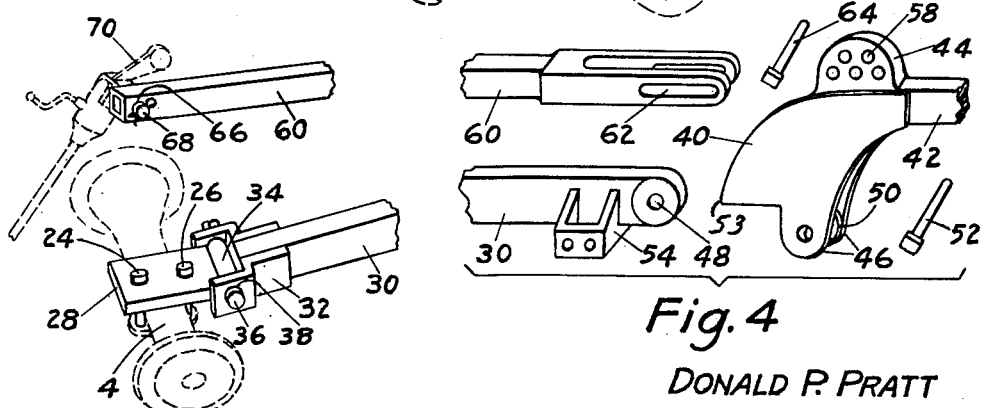
Fig.3
Fig.4
DONALD P. PRATT
INVENTOR.
BY Keith Misegades
ATTORNEY.

Patented Apr. 28, 1953

2,636,428

UNITED STATES PATENT OFFICE 2,636,428

CULTIVATOR ATTACHMENT FOR TRACTORS

Donald P. Pratt, Pipestone Township,
Berrien County, Mich.

Application July 18, 1951, Serial No. 237,350

3 Claims. (Cl. 97—47)

This invention relates to improvements in cultivator attachments for tractors.

One of the most extensively used tractors at the present time is provided with a pair of wide-spaced, rear driving wheels and adjustable-gage, front steering wheels. It is provided with power-operated mechanism for raising and lowering tillage tools that may be attached to the tractor.

Since certain tools of the heavier sort, must, of necessity be attached to the rear of the tractor, it is natural that, in the interest of interchangeability, effort has been made to locate all of the implements there. However in the cultivation of young growing crops, there is much advantage in locating the cultivating implement in front of the driver for ease in observation.

Numerous arrangements with cultivating implements on the sides of the tractor and in front of the operator have been devised but the limited space available has greatly hampered the development of implements arranged for simple attachment and detachment, yet capable of quick and easy raising to clear the growing plants. The present invention answers all these requirements yet is easily manufactured and is durable of construction. While it has the additional advantage that it may be used at the same time as conventional rear end implements on the tractor, the construction and operation of these latter implements relate to the present invention only to the extent that one does not interfere with the other.

The drawings illustrate a preferred embodiment of the invention.

Figure 1 is a front perspective view of the attachment mounted on a tractor of conventional type, the tractor being shown in light lines and with the near rear wheel removed for clarity. In this figure, the cultivating implement is shown lowered in operative position.

Figure 2 is similar to Figure 1, showing the implement raised to clear the crop being tilled.

Figure 3 is an enlarged detail from the rear, showing the means for mounting the rear portion of the attachment and the manner of connecting it to the power lift mechanism.

Figure 4 is an enlarged detail of the linkage, partly disassembled to show the manner of assembly.

In the drawings there is illustrated a widely used tractor 2. The tractor is provided with a rear axle 4 and a front axle 6. The front axle has a series of spaced holes 8 designed to permit varying the tread gage of the front wheels 10, but useful also for mounting the attachment.

A plate 12 of generally triangular shape is provided with three holes, 14, 16 and 18. Two of these holes 14 and 16 are so spaced as to receive bolts 20 passed through holes 8 in the axle and secured to the axle in conventional manner. This plate may be left mounted on the axle when the attachment is removed. The third hole 18 is provided for receiving the rod-like front end 22 of the attachment, which end is materially smaller in diameter than the hole for free movement therein.

The rear axles 4 of tractors of this type are commonly provided with front and rear bolts 24 and 26 for mounting the rear fender. The rear fender is not shown in order to better illustrate the mounting of the attachment. A plate 28 is provided with holes through which the bolts 24 and 26 may be passed to secure it as well as the fender to the tractor. This plate too may be left on the tractor when the attachment is removed. The longitudinal thrust member 30 is provided with a clevis-like member having arms 32 welded to the rear end thereof. The front end of the plate 28 has a journal member 34 for receiving pin 36 which also passed through the yoke holes 38 of the clevis. A cotter pin in the end of pin 36 will hold the attachment to the tractor while affording ease of removability.

The attachment consists principally of a longitudinal member made up in turn of a rear thrust member 30 and a forward member of roughly T shape, made up of tongue 42, relatively short upper arm 44 and longer lower arm 46. The thrust member has a bearing 48 at its forward end and the lower arm of the T link has a corresponding bearing 50 which cooperate with pin 52 to provide a pivoted connection in the longitudinal member.

Welded to the forward end of the thrust member, just behind the skirt 53 of the T link is a bracket 54 for mounting the tilling implement 56 shown here as a trip-shank cultivator. The mounting and implement shown are conventional and may be varied to suit the need of the work. If desired, the bracket may be fastened to the skirt of the T link with about the same results.

The skirt 53 has the additional purpose of serving as a stop, cooperating with the upper surface of thrust link 30 to hold the two parts of the longitudinal member rigid in operation.

The upper arm 44 is provided with a series of holes 58 for attaching the forward end of the power lift link 60. The end is formed as a clevis with elongated slots 62 in the yoke. By positioning pin 64 in one or another of holes 58, the thrust advantage of the power lift link is varied, altering the amount of lift obtained. The rear end of the lift link has a hole 66 through which pin 68 passes to connect it to arm 70 of the power lift mechanism of the tractor.

The power arm of the tractor rotates clockwise as viewed in the drawing to apply a forward and upward thrust to the power link. While there is some play in the slot 62 and the rod end 22 of T link 40, such play is much less than the movement of the power link, resulting in a buckling upward of members 30 and 40 raising the implement 56 almost vertically in the space between the front and rear wheels where the greatest clearance is to be had. Prior arrangements that rotate the implement backward about its mounting generally provide less clearance above the ground because the implement hits the under parts of the tractor before adequate clearance is had. When the implement is lowered in operating position, substantially all the thrust of the tillage is transmitted to the rear axle through the member 30.

It will be obvious that, although the attachment has been shown in relation to a specific type of tractor in general use, it is easily adapted to other types of tractors since the points of attachment are few and simply made. This is also a matter of great advantage to the user, since it is possible to remove or attach the device to a tractor in five minutes and without the use of special tools.

What is claimed is:

1. A front, side cultivator attachment for a tractor having front and rear axles and power operated implement raising and lowering mechanism, said attachment comprising: a vertical support plate for permanent mounting on the front axle of the tractor, said plate being provided in its upper portion with a hole through which a horizontally moving rod may freely slide; a horizontal mounting plate for permanent attachment to the rear axle of the tractor provided with a transverse bearing for receiving a transverse pin; a longitudinal member made up of a forward T-shaped link, the end of the tongue thereof being slidably mounted in the front axle plate and a rearwardly extending thrust link, hinged at its rear end to the rear axle plate by means of the transverse pin and at its forward end to the downwardly depending arm of the T-link; an implement supporting attachment secured to the longitudinal member close to the pivot point therein; a power lift link generally parallel to the thrust link, connecting the power lift mechanism of the tractor and the upwardly extending arm of the T-link; all arranged whereby when the power lift operates to thrust the power link forwardly, the longitudinal member is broken and the pivot point of the T-link and the thrust link is raised up to lift the implement carried by the attachment, said attachment being characterized by ease of removability from the tractor.

2. A front, side cultivator attachment for a tractor having front and rear axles and power operated implement raising and lowering mechanism, said attachment comprising: a generally vertical support plate for permanent mounting on the front axle of the tractor, said plate being provided in its upper portion with a hole; a horizontal mounting plate for permanent mounting on the rear axle of the tractor, provided with a transverse bearing for receiving a transverse pin; a longitudinal member made up of a forward T-shaped link, the end of the tongue thereof being made of a diameter small enough to move freely in the hole in the front axle plate and a rearwardly extending thrust link, hinged at its rear end to the rear axle plate by means of the transverse pin and at its forward end to the downwardly depending arm of the T-link; a skirt on the rear of the depending arm of the T-link cooperating with the upper surface of the thrust link to form a stop and thereby stiffen the longitudinal member in operative position; an implement supporting attachment secured to the longitudinal member close to the pivot point therein; a power lift link generally parallel to the thrust link, connecting the power lift mechanism of the tractor and the upwardly extending arm of the T-link; all arranged whereby when the power lift operates to thrust the power link forwardly, the longitudinal member is broken and the pivot point of the T-link and the thrust link is raised up to lift the implement carried by the attachment, said attachment being characterized by ease of removability from the tractor.

3. A front, side cultivator attachment for a tractor having front and rear axles and power operated implement raising and lowering mechanism, said attachment comprising: a generally vertical support plate for permanent mounting along its lower margin on the front axle of the tractor, said plate being provided in its upper portion with a hole; a horizontal mounting plate for permanent attachment on the rear axle of the tractor, provided with a transverse bearing for receiving a transverse pin; a longitudinal member made up of a forward T-shaped link, the end of the tongue thereof being of a diameter small enough to move freely in the hole in the front axle plate and a rearwardly extending thrust link, hinged at its rear end to the rear axle plate by means of the transverse pin and at its forward end to the downwardly depending arm of the T-link; an implement supporting attachment secured to the forward end of the thrust member close to the pivot point of the longitudinal member a power lift link, connecting the power lift mechanism of the tractor and the upwardly extending arm of the T-link; all arranged whereby, when the power lift operates to thrust the power link forwardly, the longitudinal member is broken and the pivot point of the T-link and the thrust link is raised up to lift the implement carried by the attachment, said attachment being characterized by ease of removability from the tractor.

DONALD P. PRATT.

References Cited in the file of this patent

UNITED STATES PATENTS

| Number | Name | Date |
|---|---|---|
| 1,492,791 | Goldsmith et al. | May 6, 1924 |
| 1,556,173 | Stephenson | Oct. 6, 1925 |
| 1,729,639 | Altgelt | Oct. 1, 1929 |
| 2,425,806 | Ing | Aug. 19, 1947 |